US008371825B2

(12) United States Patent
Devinat et al.

(10) Patent No.: US 8,371,825 B2

(45) Date of Patent: Feb. 12, 2013

(54) RETROFIT KIT AND METHOD OF RETROFITTING A PLUMBED EMERGENCY EYEWASH STATION

(75) Inventors: Benoit Devinat, Providence, RI (US); David J. Copeland, Milton, MA (US); Michael C. Pereira, Smithfield, RI (US)

(73) Assignee: Sperian Eye & Face Protection, Inc., Smithfield, RI (US)

( * ) Notice: Subject to any disclaimer, the term of this patent is extended or adjusted under 35 U.S.C. 154(b) by 166 days.

(21) Appl. No.: 12/917,050

(22) Filed: Nov. 1, 2010

(65) Prior Publication Data

US 2011/0046582 A1 Feb. 24, 2011

Related U.S. Application Data

(62) Division of application No. 11/552,021, filed on Oct. 23, 2006, now abandoned.

(60) Provisional application No. 60/729,526, filed on Oct. 24, 2005.

(51) Int. Cl.

| | |
|---|---|
| ***F04B 43/12*** | (2006.01) |
| ***B23P 6/00*** | (2006.01) |
| ***A47K 3/00*** | (2006.01) |

(52) U.S. Cl. ............ 417/53; 29/888.021; 4/616; 4/620; 417/313

(58) Field of Classification Search .................... 417/53, 417/313; 29/888.021; 4/516, 518, 615, 616, 4/620

See application file for complete search history.

(56) References Cited

U.S. PATENT DOCUMENTS

| | | | |
|---|---|---|---|
| 29,476 | A | 8/1860 | Ender |
| 1,638,159 | A | 8/1927 | Hopewell |
| 2,910,064 | A | 10/1959 | Brangaitis |
| 2,999,248 | A | 9/1961 | Logan et al. |
| 2,999,349 | A | 9/1961 | Logan et al. |
| 3,035,737 | A | 5/1962 | Speas |
| 3,106,722 | A | 10/1963 | Logan et al. |
| 3,904,083 | A | 9/1975 | Little |
| 4,012,798 | A | 3/1977 | Liautaud |
| D250,594 | S | 12/1978 | Gardner |
| 4,131,115 | A | 12/1978 | Peng |

(Continued)

FOREIGN PATENT DOCUMENTS

| | | |
|---|---|---|
| CN | 1625382 | 6/2005 |
| EP | 0083782 | 7/1983 |

(Continued)

OTHER PUBLICATIONS

All Safety Products, Inc., "www.allsafetyproducts.biz", Gravity Fed Eye Wash Station.

(Continued)

*Primary Examiner* — Charles Freay

(74) *Attorney, Agent, or Firm* — Barlow, Josephs & Holmes, Ltd.

(57) ABSTRACT

A retrofit kit for an emergency eyewash station and method of retrofitting a plumbed emergency eyewash station is disclosed. The kit includes a sterile eyewash fluid source. A pump assembly having an input port and an output port is also included. The input port is configured to connect to a dispensing structure of a plumbed eyewash station and the output port is configured to connect to the sterile eyewash fluid source. A drive assembly is configured to drive the pump assembly to draw sterile eyewash fluid from the sterile eyewash fluid source and discharge it through the dispensing structure of the plumbed eyewash station. The eyewash fluid discharged from the dispensing structure is configured to drain through a discharge of the plumbed eyewash station and away from the plumbed eyewash station.

4 Claims, 8 Drawing Sheets

U.S. PATENT DOCUMENTS

| | | | | |
|---|---|---|---|---|
| 4,232,671 | A | 11/1980 | Crump | |
| 4,363,146 | A | 12/1982 | Liautaud | |
| 4,493,119 | A | 1/1985 | Baumann | |
| 4,527,716 | A | 7/1985 | Haas et al. | |
| 4,641,384 | A | 2/1987 | Landsberger et al. | |
| 4,675,924 | A | 6/1987 | Allison et al. | |
| 4,688,276 | A | 8/1987 | Allison et al. | |
| 4,750,643 | A | 6/1988 | Wortrich | |
| 4,758,237 | A | 7/1988 | Sacks | |
| 4,769,863 | A | 9/1988 | Tegg et al. | |
| 4,784,652 | A | 11/1988 | Wilkstrom | |
| 4,881,283 | A | 11/1989 | Liautaud | |
| 4,928,697 | A | 5/1990 | Hsu | |
| 4,938,421 | A | 7/1990 | Berfield et al. | |
| 4,939,800 | A | 7/1990 | Fiorentino et al. | |
| 4,998,850 | A | 3/1991 | Crowell | |
| 5,008,963 | A | 4/1991 | Stein | |
| 5,046,648 | A | 9/1991 | Herbstzuber | |
| 5,150,811 | A | 9/1992 | Kelston | |
| 5,157,798 | A | 10/1992 | Van Kammen | |
| 5,170,518 | A | 12/1992 | Warriner | |
| 5,171,306 | A | 12/1992 | Vo | |
| 5,195,655 | A | 3/1993 | Bukhman | |
| 5,201,726 | A | 4/1993 | Kirkham | |
| 5,216,765 | A | 6/1993 | Paterson et al. | |
| 5,230,109 | A | 7/1993 | Zaccai et al. | |
| D342,309 | S | 12/1993 | Paterson et al. | |
| 5,320,615 | A | 6/1994 | Van Keuren | |
| 5,334,180 | A | 8/1994 | Adolf et al. | |
| 5,381,567 | A * | 1/1995 | Tanner et al. | 4/620 |
| 5,401,259 | A | 3/1995 | Py | |
| 5,530,972 | A | 7/1996 | Tanner | |
| 5,566,406 | A | 10/1996 | Demeny et al. | |
| 5,607,410 | A | 3/1997 | Branch | |
| 5,634,458 | A | 6/1997 | Joshi et al. | |
| 5,678,255 | A | 10/1997 | Stoudamire, Sr. | |
| 5,687,434 | A | 11/1997 | Tagg | |
| 5,695,124 | A | 12/1997 | Demeny et al. | |
| 5,732,853 | A | 3/1998 | Ganzeboom et al. | |
| 5,740,569 | A | 4/1998 | Gurries, II et al. | |
| 5,754,900 | A | 5/1998 | Suda | |
| 5,791,519 | A | 8/1998 | Van Marcke | |
| 5,850,641 | A | 12/1998 | Demeny et al. | |
| 5,967,197 | A | 10/1999 | Shown | |
| 6,029,293 | A | 2/2000 | Paterson et al. | |
| 6,070,279 | A * | 6/2000 | Lundstedt | 4/620 |
| 6,095,772 | A | 8/2000 | Ramey et al. | |
| 6,098,844 | A | 8/2000 | Nicolle | |
| 6,131,766 | A | 10/2000 | King et al. | |
| 6,142,344 | A | 11/2000 | Kai | |
| 6,161,228 | A | 12/2000 | Wietecha | |
| 6,176,847 | B1 | 1/2001 | Humphreys, Jr. et al. | |
| 6,186,361 | B1 | 2/2001 | Teetsel, III | |
| D438,983 | S | 3/2001 | Stein | |
| 6,205,599 | B1 | 3/2001 | Anders | |
| 6,270,014 | B1 | 8/2001 | Bollas et al. | |
| 6,296,626 | B1 | 10/2001 | Stein | |
| 6,385,794 | B1 | 5/2002 | Miedzius et al. | |
| 6,398,766 | B1 | 6/2002 | Branch | |
| 6,432,078 | B1 | 8/2002 | Peyman | |
| 6,458,108 | B1 | 10/2002 | Tangri | |
| D466,589 | S | 12/2002 | Miedzius | |
| 6,510,965 | B1 | 1/2003 | Decottignies et al. | |
| 6,520,431 | B2 | 2/2003 | Donovan | |
| 6,540,726 | B1 | 4/2003 | Follman et al. | |
| 6,554,164 | B1 | 4/2003 | Jones | |
| 6,561,383 | B1 | 5/2003 | Reddy et al. | |
| 6,595,920 | B2 | 7/2003 | Walton | |
| 6,610,036 | B2 | 8/2003 | Branch et al. | |
| 6,726,061 | B2 | 4/2004 | Good | |
| 6,758,837 | B2 | 7/2004 | Peclat et al. | |
| 6,782,568 | B2 | 8/2004 | Novak et al. | |
| 6,913,598 | B2 | 7/2005 | Tangri | |
| 2001/0052681 | A1 | 12/2001 | Deavila | |
| 2003/0032930 | A1 | 2/2003 | Branch | |
| 2003/0059320 | A1 | 3/2003 | Kim et al. | |
| 2003/0208186 | A1 | 11/2003 | Moreyra | |
| 2004/0204674 | A1 | 10/2004 | Anderson et al. | |
| 2004/0244106 | A1 | 12/2004 | Chesters | |
| 2005/0054992 | A1 | 3/2005 | Madritsch et al. | |
| 2005/0077318 | A1 | 4/2005 | Macler et al. | |
| 2005/0123424 | A1 | 6/2005 | Wickham et al. | |
| 2005/0217019 | A1 | 10/2005 | Johnson et al. | |

FOREIGN PATENT DOCUMENTS

| | | | |
|---|---|---|---|
| EP | 0723769 | B1 | 7/2001 |
| FR | 2625098 | | 6/1989 |
| GB | 2157569 | A | 10/1985 |
| JP | 08289916 | | 11/1996 |
| JP | 10151148 | | 6/1998 |
| JP | 2001079061 | | 3/2001 |
| WO | 8702237 | A1 | 4/1987 |
| WO | 8705498 | A1 | 9/1987 |
| WO | 9619177 | A1 | 6/1996 |
| WO | 03065967 | A1 | 8/2003 |

OTHER PUBLICATIONS

PlumberSurplus, "www.pumbersurplus.com", Speakman SE-577-SD Emergency Safety Equipment Eyewash Station.

Ramsey Group, "www.ramsey-group.com/pureflow1000.html", Fend-All Pure Flow 1000 Emergency Eyewash Station (FEN-1000).

First Aid Supplies & Safety Products, "www.firstaidandsafetyonline.com/showproduct-catid-24.asp", Eyewash Station, Bradley Eyewash Stations, Emergency Eyewash Station, Portable Eyewash.

* cited by examiner

RETROFIT KIT AND METHOD OF RETROFITTING A PLUMBED EMERGENCY EYEWASH STATION

CROSS-REFERENCE TO RELATED APPLICATIONS

The present patent document is a division of U.S. application Ser. No. 11/552,021, filed on Oct. 23, 2006, which claims priority to earlier filed U.S. Provisional Patent Application No. 60/729,526, filed Oct. 24, 2005, the entire contents of which are incorporated herein by reference.

BACKGROUND OF THE INVENTION

1. Field of the Invention

The present invention relates generally to emergency eyewash stations, and more particularly to a retrofit kit and method of retrofitting an emergency eyewash station to use a sterile eyewash fluid instead of tap water.

2. Background of the Related Art

Emergency eyewash stations take many forms, including plumbed stations, self-contained fixed-mounted units and portable units. Generally speaking, these stations are designed to dispense eyewash fluid (typically water) upon demand.

The plumbed eyewash stations are generally connected to the water supply pipes of an existing sink or are installed as a stand-alone emergency eyewash station with the water supply and draining connected to the regular building water systems. An example of a plumbed eyewash station is found in U.S. Pat. No. 5,740,569 issued to Gurries, II et al, which discloses a rotatable spray nozzle mounted to the base of a regular laboratory sink. The spray nozzle is piped directly into the main water supply and includes a valve that is opened when the spray nozzle is rotated into active position above the sink. Although plumbed eyewash stations generally provide instant availability of a washing spray they suffer from the disadvantage of relying on ordinary tap water as the cleansing agent. For example, tap water may carry bacteria and other unknown chemicals and contaminants that could cause infection of the eyes. It has been recognized that it would be more advantageous to have a system that used an eyewash fluid that was known to be free of foreign substances, i.e. filtered, purified or sterilized.

Attempts have been made to retrofit plumbed stations with an external source of eyewash fluid that has been purified or sanitized. U.S. Pat. No 6,070,279 issued to Lundstedt discloses one such retro-fit system. However, the Lundstedt patent relies upon the force of gravity to dispense the eyewash fluid from the station. Although the force of gravity offers several other advantages, it lacks the advantage of being able to maintain a constant and steady flow of eyewash fluid from the dispensing head of the station. In fact, the pressure steadily dwindles as the reservoir empties.

Turning to standalone wall-mounted and portable units, these stations typically have internal reservoirs that also rely upon the force of gravity to dispense the eyewash fluid. The U.S. Pat. No. 4,881,283 issued to Liautaud shows an example of a wall-mount unit.

In an effort to encourage more suitable eye wash facilities, the American National Standards Institute (ANSI) promulgated voluntary standards for portable eye wash fountains relating to flushing periods and the rate of flow of wash fluid. These standards dictate that portable eye wash fountains should deliver no less than 0.4 gallons per minute (1.5 liters per minute) of eye wash fluid for a time period of at least 15 minutes. Responsive to the new ANSI standards, several new designs emerged seeking to provide the required flow rates for the minimum periods of time. For the most part, the eye wash stations currently on the market do provide the required flow rates for the minimum period of time.

However, newer ANSI and OSHA regulations have created additional issues that will need to be addressed, and will require improvements to the existing designs to maintain compliance. In particular, upcoming OSHA regulations will soon require the use of "sterile" eye wash fluids. As with any use of a sterile fluid, there is a desire to maintain sterility of both the source of the fluid and throughout the delivery paths and delivery mechanisms, including all delivery lines, nozzles, and pumps, if included in the delivery system.

Therefore, there is a need for new emergency eyewash systems to provide a sterile source of eyewash fluid, to maintain a steady and constant flow of eyewash fluid from the source, and to provide a sterile delivery path from the source to the delivery site.

SUMMARY OF THE INVENTION

The present invention seeks to solve some of the shortcomings of the prior art by providing a reusable/disposable impeller assembly that can be used by both plumbed, self-contained fixed-mount and portable emergency eyewash stations to deliver sterile fluid from the sterile source to the delivery site.

The impeller assembly of the present invention includes an impeller housing having an interior pumping chamber, input port into the chamber and an output port out of the chamber, and an impeller wheel rotatably mounted within the housing. The impeller wheel includes an impeller drive shaft having a drive interface that can mate with any one of multiple different drive mechanisms depending upon the installation and application. The impeller housing and wheel are designed so as to deliver the recommended 0.4 gallons per minute of fluid to the station spray nozzle. The impeller assembly is intended to be manufactured from a plastic material and is sterilized prior to installation so that the path through the impeller housing remains sterile prior to receiving the sterile eyewash fluid at the time of delivery.

In short, the impeller assembly is a simple sterile pump mechanism having an input port and an output port, and a drive interface for mating the impeller assembly with a drive mechanism.

In one embodiment, the drive mechanism comprises a second impeller wheel driven by a source of moving fluid, such as running water. This embodiment utilizes the available source of tap water as a drive mechanism to pump the sterile fluid from the source to the spray nozzles, obviating the need for any electrical power source or complicated gravity feed systems to move the sterile fluid.

In a second embodiment, the drive mechanism comprises an electrically powered drive motor. The impeller drive interface is mated with a corresponding interface on the drive shaft of a conventional electric motor. At the time of delivery, the electric motor is energized to drive the impeller to pump the sterile eyewash fluid from the source to the spray nozzles. This type of unit requires electrical power, and may further include a battery back-up Finally, in a third embodiment, the entire eyewash station is constructed for use as a portable wheeled assembly wherein the sterile eyewash source, dispensing spray nozzles, power supply and battery backup are mounted on a wheeled cart frame so that the station can be deployed where ever necessary.

Accordingly, among the objects of the present invention is the provision for an impeller assembly for an emergency eyewash station that can be powered by different drive mechanism, including fluid and electric drive means.

Yet, another object of the present invention is the provision for an impeller assembly for an emergency eyewash station that is disposable and/or recyclable.

Yet, another object of the present invention is the provision of an impeller assembly for an emergency eyewash station where the impeller assembly is isolated from the means for driving the impeller assembly.

Yet, another object of the present invention is the provision for an impeller assembly for an emergency eyewash station that maintains a constant steady flow of eyewash fluid.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
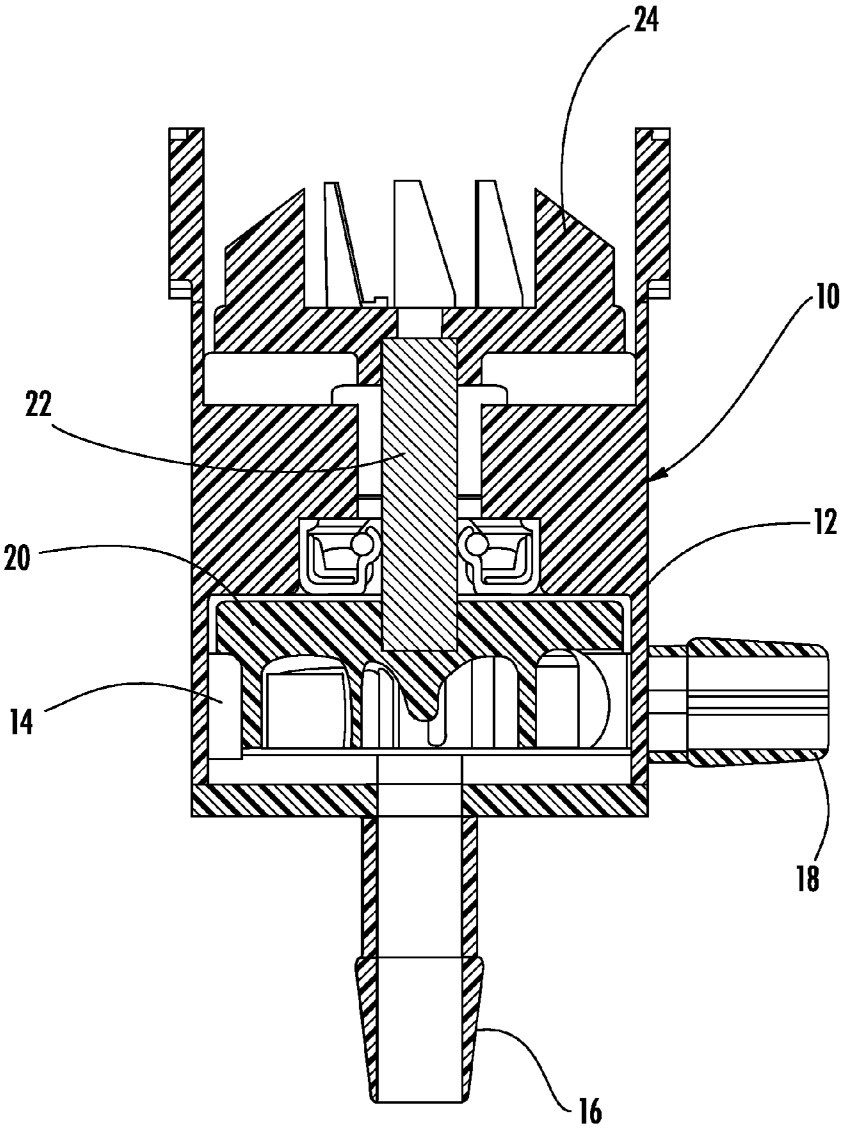
FIG. 1 is a cross-section view of a first embodiment of the impeller assembly of the present invention.

Referring to FIG. 1, the impeller assembly of the present invention is shown generally at 10. The impeller assembly includes a pump housing 12 having an interior pumping chamber 14, input port 16 into the chamber 14 and an output port 18 out of the chamber 14, and an impeller pump wheel 20 rotatably mounted within the housing 12.

The impeller pump wheel 20 includes a pump drive shaft 22 having a drive interface 24 that can mate with any one of multiple different drive mechanisms depending upon the installation and application. The impeller pump housing 12 and impeller pump wheel 20 are designed to deliver the recommended 0.4 gallons per minute of fluid to the station spray nozzle (shown in FIG. 3). The impeller assembly 10 is intended to be manufactured from a plastic material and is sterilized prior to installation so that the path through the impeller pump housing 12 remains sterile prior to receiving the sterile eyewash fluid at the time of delivery.

Figure 2:
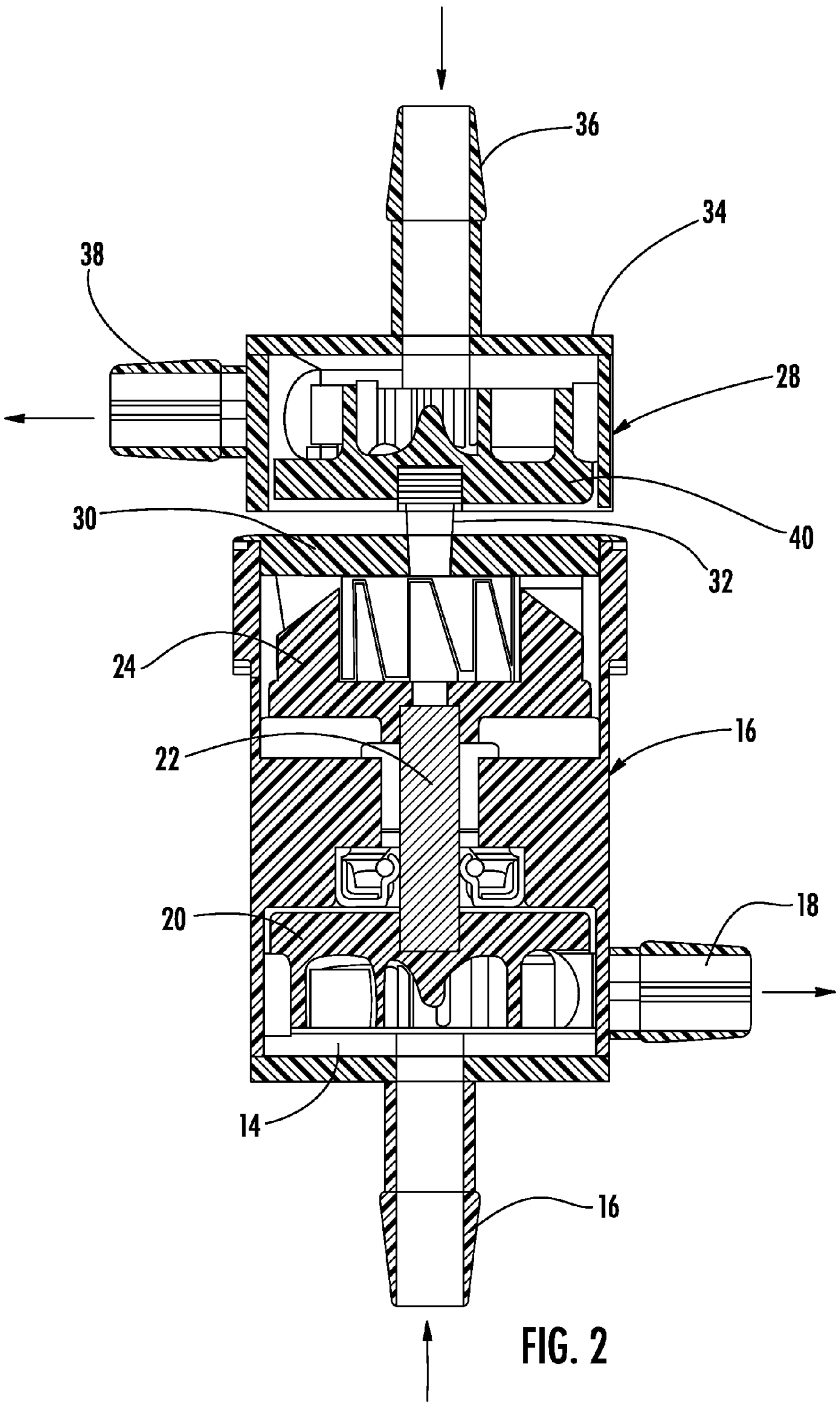
FIG. 2 is a cross-section view of the impeller assembly mated with a fluid impeller drive means.
Figure 3:
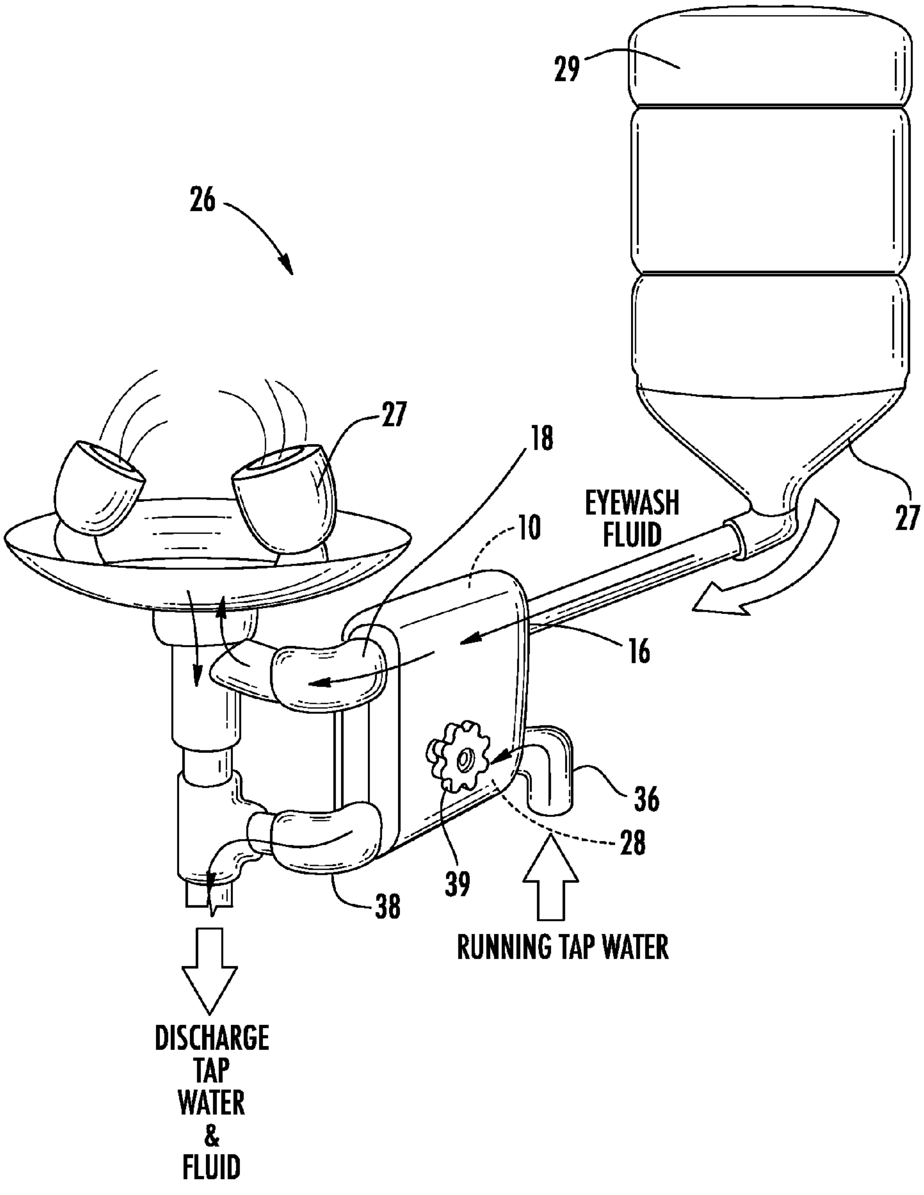
FIG. 3 is a perspective view of a plumbed emergency eyewash station including a sterile eyewash fluid source, and the impeller assembly of the present invention driven by a source of plumbed tap water.
Figure 4:
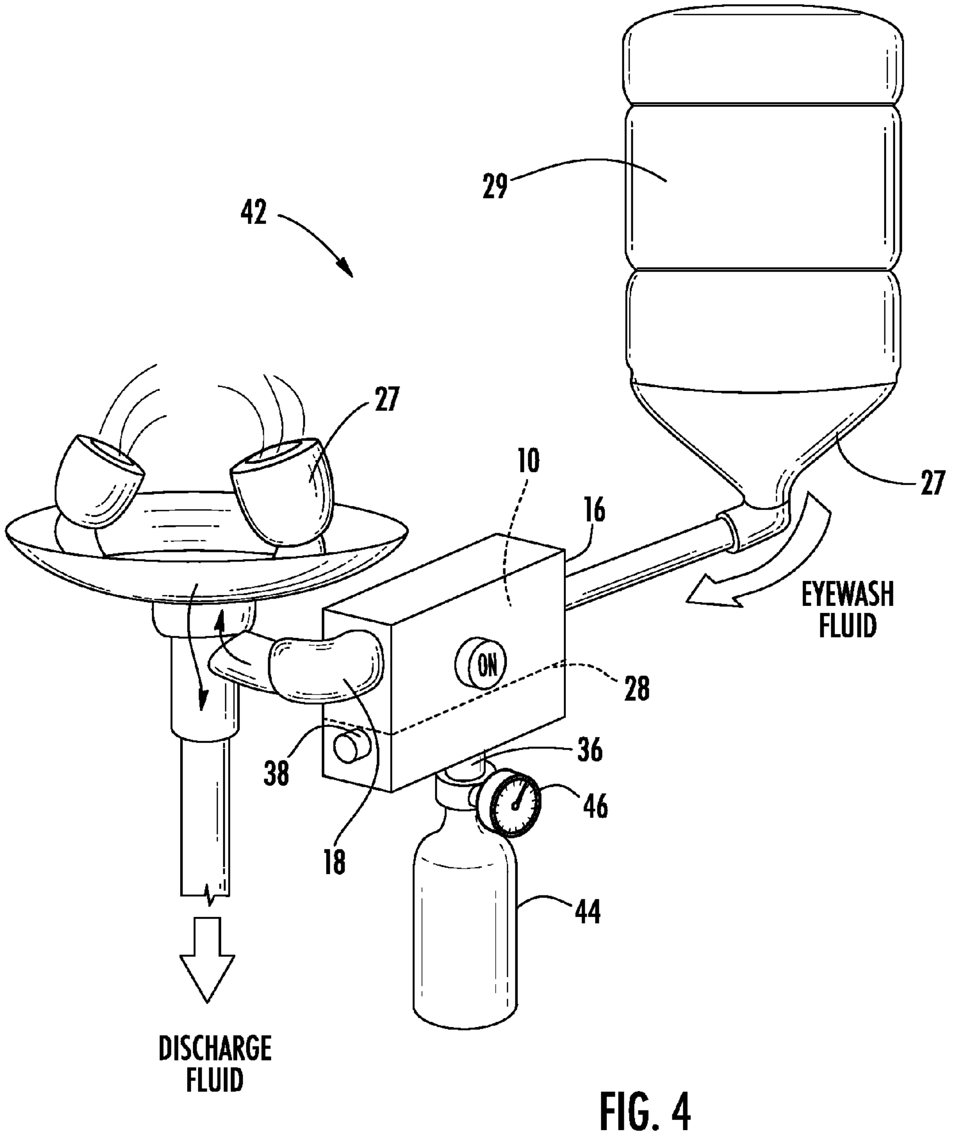
FIG. 4 is a perspective view of a plumbed emergency eyewash station including a sterile eyewash fluid source, and a impeller assembly of the present invention driven by a source of compressed gas.

Referring to FIGS. 2 and 3, a first embodiment of an eyewash station, shown generally at 26 in FIG. 3, is configured and arranged to be driven by a propellant fluid, such as running tap water or alternatively a compressed gas source (shown in FIG. 4). The eyewash station has a dispensing structure 27 having spray nozzles connected to a sterile eyewash fluid source 29. The impeller pump assembly 10 and drive impeller 28 are interposed between the sterile eyewash fluid source 29 and the dispensing structure 27. The sterile eyewash fluid source shown includes a container, such as a sealed bottle inverted into a receiver assembly that includes a truncheon (not shown) for piercing the seal and allowing the eyewash fluid to drain into the receiver assembly and prime the station for use. Extending from the receiver assembly is a transport tube, which is connected to the impeller pump assembly 10. The impeller pump assembly 10 is driven by a second impeller unit (impeller drive unit) 28 having a complimentary drive interface or coupler 30 at the end of an impeller drive shaft 32.

The impeller drive unit 28 of the first embodiment has an impeller drive housing 34 with an intake port 36 and an exhaust port 38 defining a path for the propellant fluid. Rotatably mounted within the impeller drive housing 34 is an impeller drive wheel 40 connected to and to drive the impeller drive shaft 32. The drive interface 30 on the impeller drive shaft 32 cooperates with the engagement interface 24 on the impeller pump assembly 10 to drive the impeller pump shaft 22 and the impeller pump wheel 20. The impeller drive wheel 40 is positioned within the impeller pump housing 34 and is in fluid connection with the intake port 36 and the exhaust port 38 so that the propellant fluid entering the intake port 36 propels the impeller drive wheel 40 before exiting the exhaust port 38.

Flow of the eyewash fluid is initiated by opening a valve 39 to start the flow of running water. As the propellant fluid forces rotation of the impeller drive wheel 40, the impeller drive shaft 32 turns the drive interface 30 to operate the impeller pump assembly 10. As the impeller pump wheel 20 rotates, it draws eyewash fluid through the intake port 16 into the pumping chamber 14 and projects the eyewash fluid out the exhaust port 18.

Referring to FIG. 4, alternatively, if a source of running water is not easily accessible, the system 42 could use a container of a compressed gas 44, such as compressed carbon dioxide gas, fed through a pressure regulator 46 as the propellant fluid. The gas flow drives the impeller drive wheel 40, in turn pumping the eyewash fluid.

The impeller pump assembly 10 may be entirely removed and replaced as needed to ensure that the emergency eyewash station 26, 42 remains clean and free of foreign substances that may cause further injury through infection. Because the pump housing 12 remains isolated from the drive housing 34, the drive housing 34 does not need to be replaced and may be mounted permanently with the emergency eyewash station 26, 42.

Figure 5:
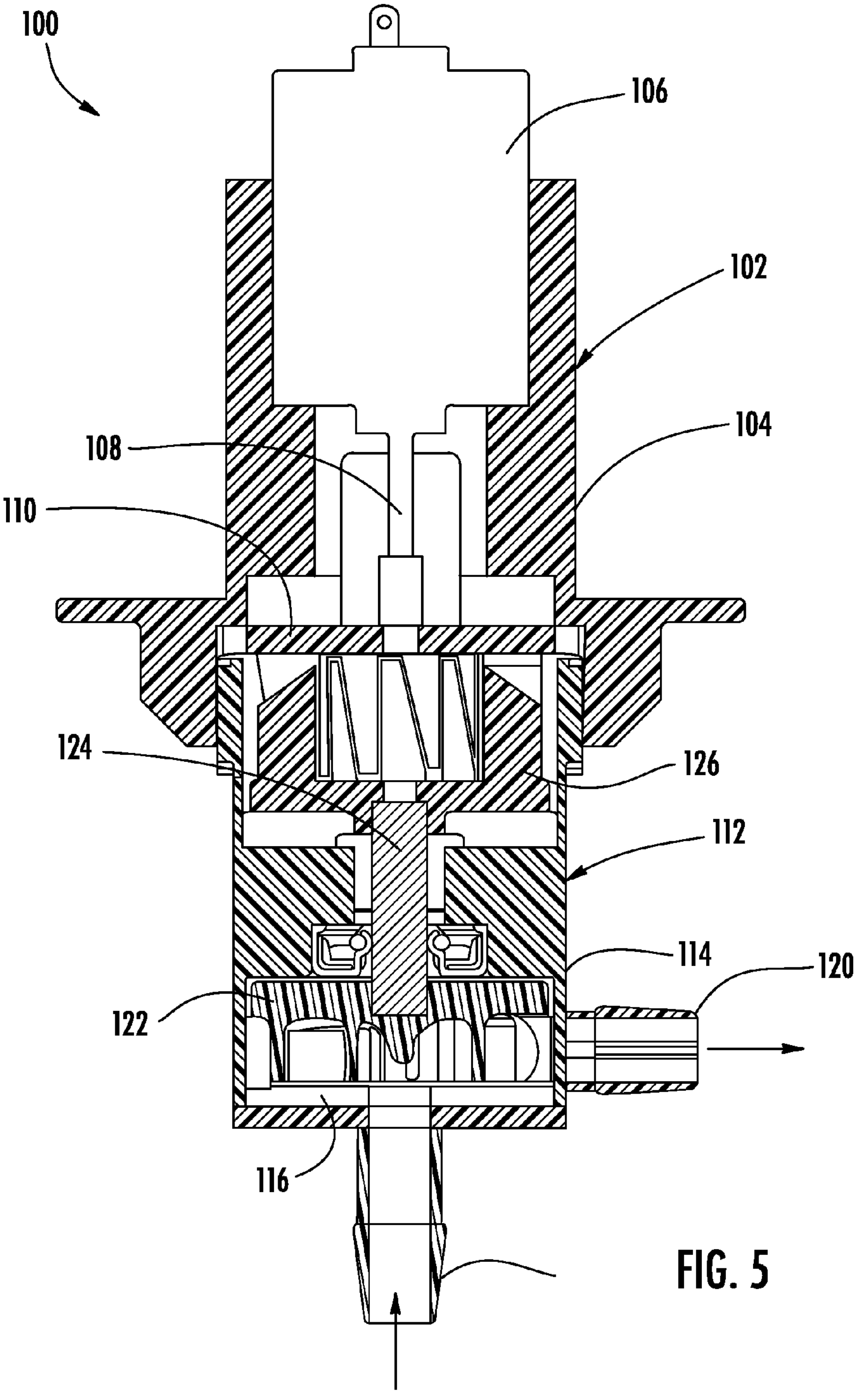
FIG. 5 is a cross-section view of the impeller assembly mated with an electric motor drive.
Figure 6:
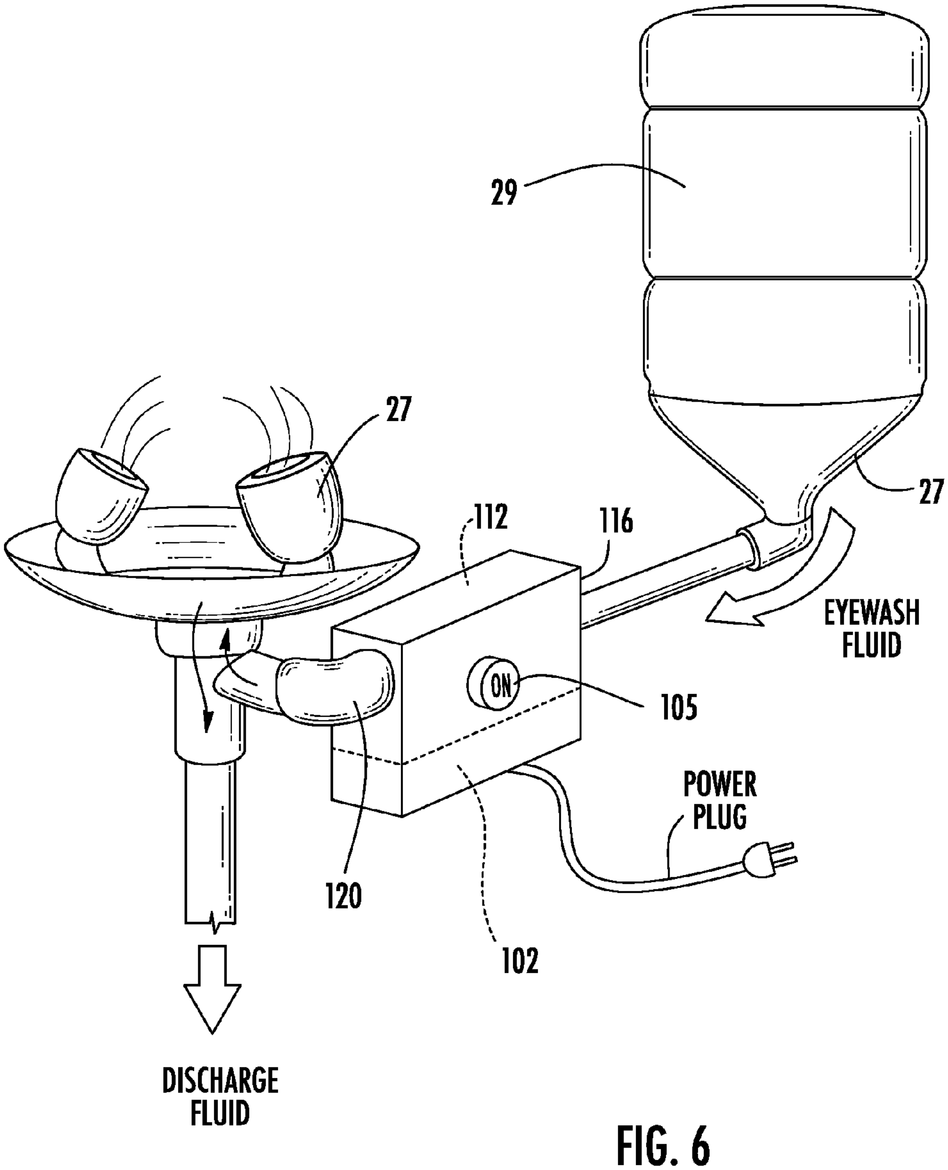
FIG. 6 is a perspective view of a plumbed emergency eyewash station including a sterile eyewash fluid source, and the impeller assembly of the present invention driven by an electric motor.

Referring to FIGS. 5 and 6, the second embodiment of the impeller pump assembly of the present invention is shown generally 100. In this embodiment, the drive means is an electric motor assembly 102. The electric motor assembly 102 includes a motor housing 104 supporting an electric motor 106, which drives a drive shaft 108, which in turn drives a drive interface 110. In all other respects, the second embodiment 100 is the same as the first embodiment 10, with the exception of an electric switch 105 to selectively energize the motor 106 in place of a valve to start the flow of the eyewash fluid. In particular, an impeller pump assembly 112 has a pump housing 114 having a pumping chamber 116. The pumping chamber has an input port 118 and an output port 120. An impeller drive wheel 122 is rotatably mounted within the pumping chamber 116 and is driven by a drive shaft 124. The drive shaft 124 is driven by an impeller drive interface 126, which is configured to couple to and be drive by the drive interface 110 of the electric motor assembly 102.

Figure 7:
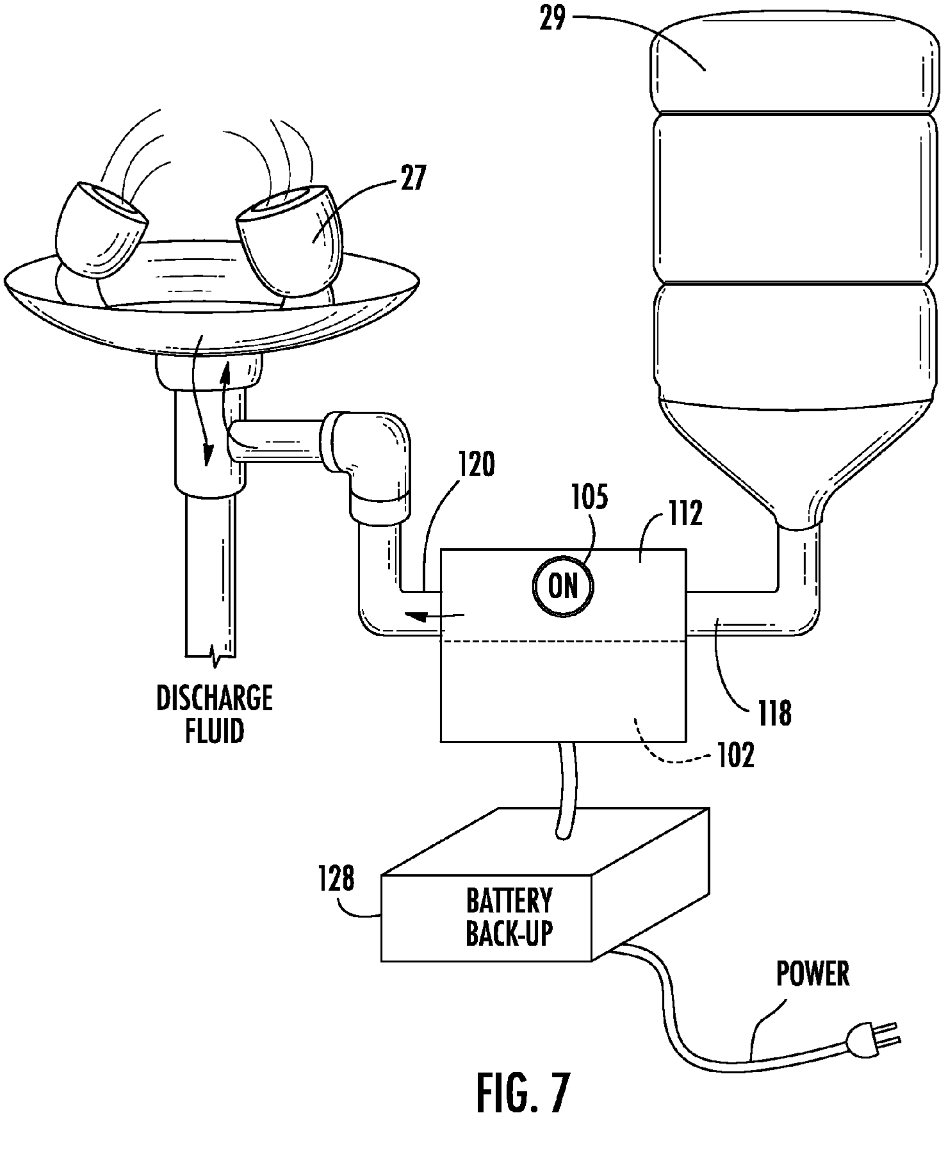
FIG. 7 is another perspective view of a plumbed emergency eyewash station including a sterile eyewash fluid source, and the impeller assembly of the present invention driven by an electric motor, and including a battery backup.

Referring to FIG. 7, another embodiment is illustrated and is shown to include a battery back-up power source 128 to power the electric motor assembly 102 in the event that electric power is lost during a power failure or other site emergency.

Figure 8:
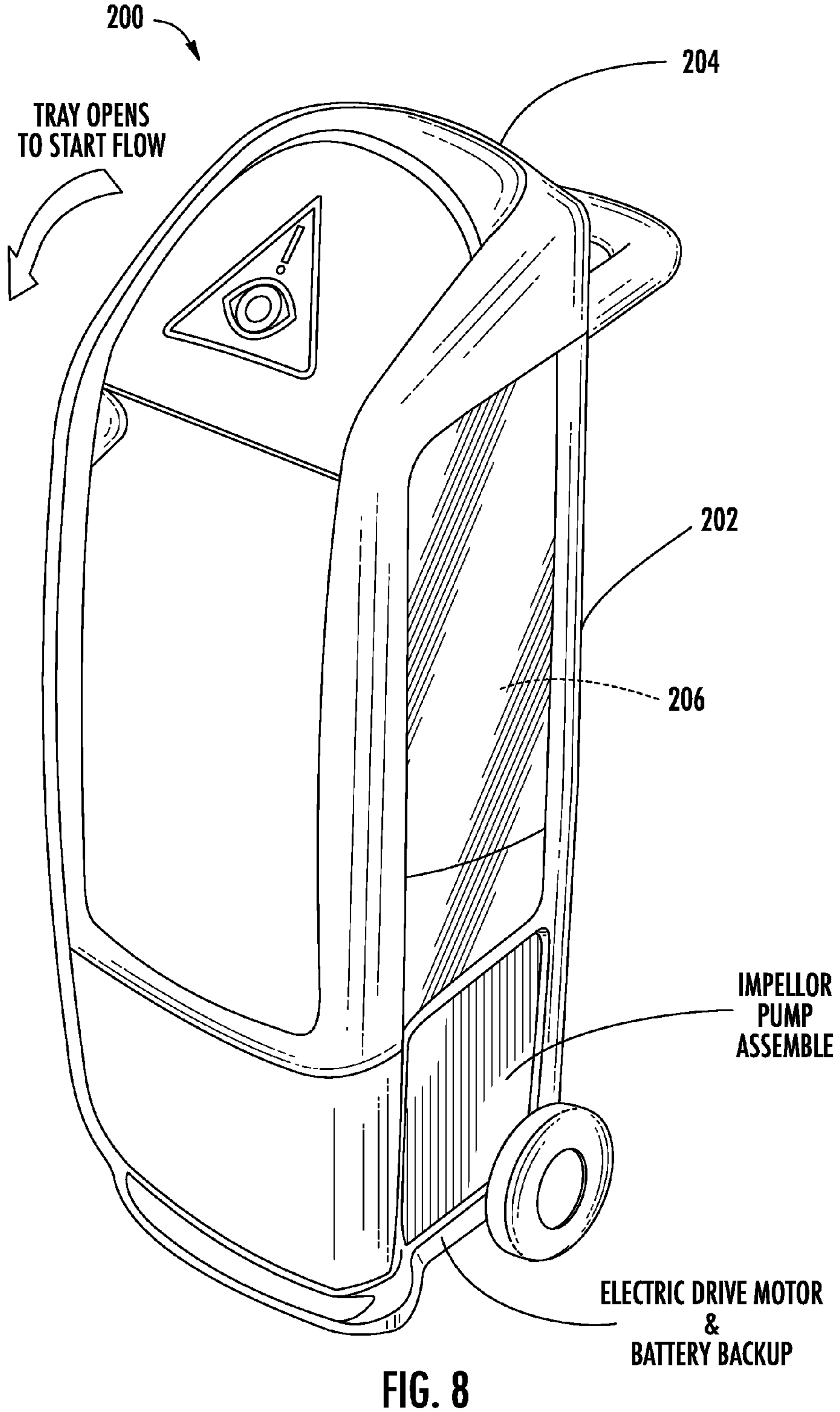
FIG. 8 is a perspective view of a portable emergency eyewash station including a sterile eyewash fluid source, and the impeller assembly of the present invention driven by an electric motor, and including a battery backup.

Referring to FIG. 8, a portable emergency eyewash station is illustrated in a form configured and arranged to employ the electric drive motor and battery back-up system as shown generally at 200. In particular, the portable emergency eyewash station 200 of the present invention has body portion 202 having a pivotally attached actuator arm 204. A reservoir 206 holding eyewash fluid is contained with the body portion 202. A dispensing structure (not shown) is mounted on a pivoting actuator arm 204 and is connected by a dispensing hose to the second embodiment 100 of the pump of the present invention, which is connected by a feed hose to the reservoir 206. A battery (not shown) is connected by a pair of wires (not shown) to the electric motor 106 on the pump and to a switch (not shown) by a second set of wires (not shown). The switch is positioned adjacent to the actuator arm 204 so that the actuator arm 204 depresses the switch when the actuator arm 204 is pivoted.

The portable emergency eyewash station 200 includes a pair of wheels 208 mounted near the bottom of the body portion 202 and a handle 210 extending rearward from the top portion of the body portion 202. By pulling rearward on the handle 210, an operator can wheel the portable emergency eyewash station 200 to a desired location exactly like a dolly.

Although the portable emergency eyewash station 200 is described embodying the electrically powered pump 100, it could also be easily configured to receive the fluid powered pump of the first embodiment 10. In particular, a compressed gas cylinder with an attached regulator could be configured and arranged within the body of the portable emergency eyewash station to drive the drive impeller of the pump.

Therefore, it can be seen that the present invention provides a unique solution to the problems of the prior art by uniquely providing a pump for an emergency eyewash station that is powered by a propellant fluid or an electric motor and has a disposable or replaceable impeller housing.

It would be appreciated by those skilled in the art that various changes and modifications can be made to the illustrated embodiments without departing from the spirit of the present invention. All such modifications and changes are intended to be within the scope of the present invention except as limited by the appended claims.

What is claimed:

1. A retrofit kit for a plumbed eyewash station, said plumbed eyewash station having plumbed source of running tap water, a dispensing structure connected to said plumbed source of tap water, a discharge connected to said dispensing structure, comprising:

a sterile eyewash fluid source;

a pump assembly having an input port and an output port, said input port configured and arranged to connect to a dispensing structure of a plumbed eyewash station, said output port configured and arranged to connect to said sterile eyewash fluid source; and a drive assembly configured and arranged to drive said pump assembly to draw sterile eyewash fluid from said sterile eyewash fluid source and discharge it through said dispensing structure of said plumbed eyewash station;

wherein the drive assembly includes an intake port connected to a plumbed source of tap water and an exhaust port connected to a discharge of a plumbed eyewash station, whereby tap water running from said plumbed source of tap water drives said drive assembly;

said eyewash fluid discharged from said dispensing structure draining through a discharge of said plumbed eyewash station and away from said plumbed eyewash station.

2. A retrofit kit for a plumbed eyewash station which has been disconnected from a plumbed source of water, said plumbed eyewash station having a dispensing structure and a discharge connected to said dispensing structure, comprising:

a sterile eyewash fluid source;

a pump assembly having an input port and an output port, said input port configured and arranged to connect to a dispensing structure of a plumbed eyewash station, said output port configured and arranged to connect to said sterile eyewash fluid source; and a drive assembly configured and arranged to drive said pump assembly to draw sterile eyewash fluid from said sterile eyewash fluid source and discharge it through said dispensing structure of said plumbed eyewash station;

wherein the drive assembly includes an intake port connected to a compressed gas source, whereby compressed gas escaping from compressed gas source drives said drive assembly;

said eyewash fluid discharged from said dispensing structure draining through a discharge of said plumbed eyewash station and away from said plumbed eyewash station.

3. A method of retrofitting a plumbed eyewash station, said plumbed eyewash station having a plumbed source of tap water, a dispensing structure connected to said plumbed source of tap water, and a discharge connected to said dispensing structure, comprising:

disconnecting a plumbed source of tap water from a dispensing structure of a plumbed eyewash station;

connecting an output port of a pump assembly to said dispensing structure;

connecting a sterile eyewash fluid source to an input port of said pump assembly;

connecting a drive assembly to said pump assembly to drive said pump assembly;

connecting an impeller drive unit to said drive assembly;

connecting said plumbed source of tap water to an intake port of said impeller drive unit; and connecting an exhaust port of said impeller drive unit to said discharge.

4. A method of retrofitting a plumbed eyewash station, said plumbed eyewash station having a plumbed source of tap water, a dispensing structure connected to said plumbed source of tap water, and a discharge connected to said dispensing structure, comprising:

disconnecting a plumbed source of tap water from a dispensing structure of a plumbed eyewash station;

connecting an output port of a pump assembly to said dispensing structure;

connecting a sterile eyewash fluid source to an input port of said pump assembly;

connecting a drive assembly to said pump assembly to drive said pump assembly;

connecting an impeller drive unit to said drive assembly; and connecting a compressed gas source to an intake port of said impeller drive unit to drive said drive assembly.

* * * * *